US012734882B2

(12) United States Patent
Ito

(10) Patent No.: US 12,734,882 B2
(45) Date of Patent: Sep. 15, 2026

(54) IN-VEHICLE DISPLAY SYSTEM

(71) Applicant: TOYOTA JIDOSHA KABUSHIKI KAISHA, Toyota (JP)

(72) Inventor: Hironori Ito, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/986,873

(22) Filed: Dec. 19, 2024

(65) Prior Publication Data

US 2025/0242693 A1 Jul. 31, 2025

(30) Foreign Application Priority Data

Jan. 31, 2024 (JP) ................................ 2024-012819

(51) Int. Cl.
*B60K 35/22* (2024.01)
*B60K 35/26* (2024.01)

(52) U.S. Cl.
CPC .............. *B60K 35/22* (2024.01); *B60K 35/26* (2024.01); *B60K 2360/188* (2024.01)

(58) Field of Classification Search
CPC .. B60K 35/22; B60K 35/26; B60K 2360/188; B60K 31/18; B60K 35/29; B60K 2360/178; B60K 2360/179; B60K 2360/1868; B60K 2360/191; B60K 35/28; B60K 35/81; B60K 2031/0016; B60K 2031/0033; B60K 35/23; B60R 1/24; B60Q 9/00
See application file for complete search history.

(56) References Cited

U.S. PATENT DOCUMENTS

2005/0128061 A1* 6/2005 Yanai .................... G08G 1/167 348/E7.086
2016/0257199 A1 9/2016 Bark et al.
2019/0077418 A1 3/2019 Quander
2020/0180434 A1 6/2020 Tachibana et al.
2021/0393206 A1 12/2021 Kusanagi et al.
2024/0034314 A1 2/2024 Kinugawa et al.

FOREIGN PATENT DOCUMENTS

JP 2001-199257 A 7/2001
JP 2017-041126 A 2/2017
JP 2022-162733 A 10/2022

* cited by examiner

*Primary Examiner* — Daryl C Pope
(74) *Attorney, Agent, or Firm* — Oliff PLC

(57) ABSTRACT

The display system includes a lane line recognition unit configured to recognize a lane line of a traveling lane of the host vehicle based on a detection result of a camera of the host vehicle, a road edge structure recognition unit configured to recognize a road edge structure positioned outside the lane line based on a detection result of a sensor of the host vehicle, and a display control unit configured to control a display of the in-vehicle display based on recognition results of the lane line recognition unit and the road edge structure recognition unit. The display control unit is configured to display a road edge structure icon corresponding to the road edge structure on the in-vehicle display when the lane line is not recognized and the road edge structure is recognized.

5 Claims, 4 Drawing Sheets

IN-VEHICLE DISPLAY SYSTEM

CROSS REFERENCE TO RELATED APPLICATIONS

This application is based upon and claims the benefit of priority from Japanese Patent Application No. 2024-012819, filed on Jan. 31, 2024, the entire contents of which are incorporated herein by reference.

TECHNICAL FIELD

The present disclosure relates to an in-vehicle display system.

BACKGROUND

As a technical document related to an in-vehicle display system mounted on a host vehicle, Japanese Unexamined Patent Application Publication No. 2017-41126 is known. In the in-vehicle display system described in this publication, when a preceding vehicle traveling ahead of the host vehicle is a control target of the host vehicle (for example, a target of following control), a control target display corresponding to the preceding vehicle icon is displayed on the display screen of the host vehicle.

SUMMARY

However, when the host vehicle is performing following control on the preceding vehicle, and there is a pre-preceding vehicle that is vehicle ahead of the preceding vehicle, the pre-preceding vehicle may become a target of deceleration control different from the following control. This is to decelerate the host vehicle in advance, considering that the deceleration of the pre-preceding vehicle may affect the traveling of the preceding vehicle. In such cases, if the relationship between the preceding vehicle icon, the pre-preceding vehicle icon, and the traveling control of the host vehicle is not appropriately displayed on the display screen, there is a risk that the driver who is not aware of the deceleration of the pre-preceding vehicle may feel anxious.

The present disclosure aims to provide an in-vehicle display system that can alleviate the driver's anxiety.

According to an aspect of the present disclosure, there is provided an in-vehicle display system is mounted on a host vehicle and displays the surroundings of the host vehicle on an in-vehicle display inside the vehicle cabin. The in-vehicle display system includes a display control unit that controls the display of the in-vehicle display. When the host vehicle performs following control on the preceding vehicle traveling ahead of the host vehicle, the display control unit executes a following control target display on the preceding vehicle icon corresponding to the preceding vehicle on the in-vehicle display. During the execution of following control, even if pre-preceding vehicle that is vehicle ahead of the preceding vehicle is detected, the display control unit does not display an icon corresponding to the pre-preceding vehicle on the in-vehicle display. When the pre-preceding vehicle becomes a deceleration control target of the host vehicle during the execution of following control, the display control unit executes a deceleration control target display on the pre-preceding vehicle icon corresponding to the pre-preceding vehicle on the in-vehicle display while maintaining the following control target display on the preceding vehicle icon.

According to the present disclosure, it is possible to provide an in-vehicle display system that can alleviate the driver's anxiety.

DETAILED DESCRIPTION

Hereinafter, embodiments of the present disclosure will be described in detail with reference to the drawings.

Figure 1:
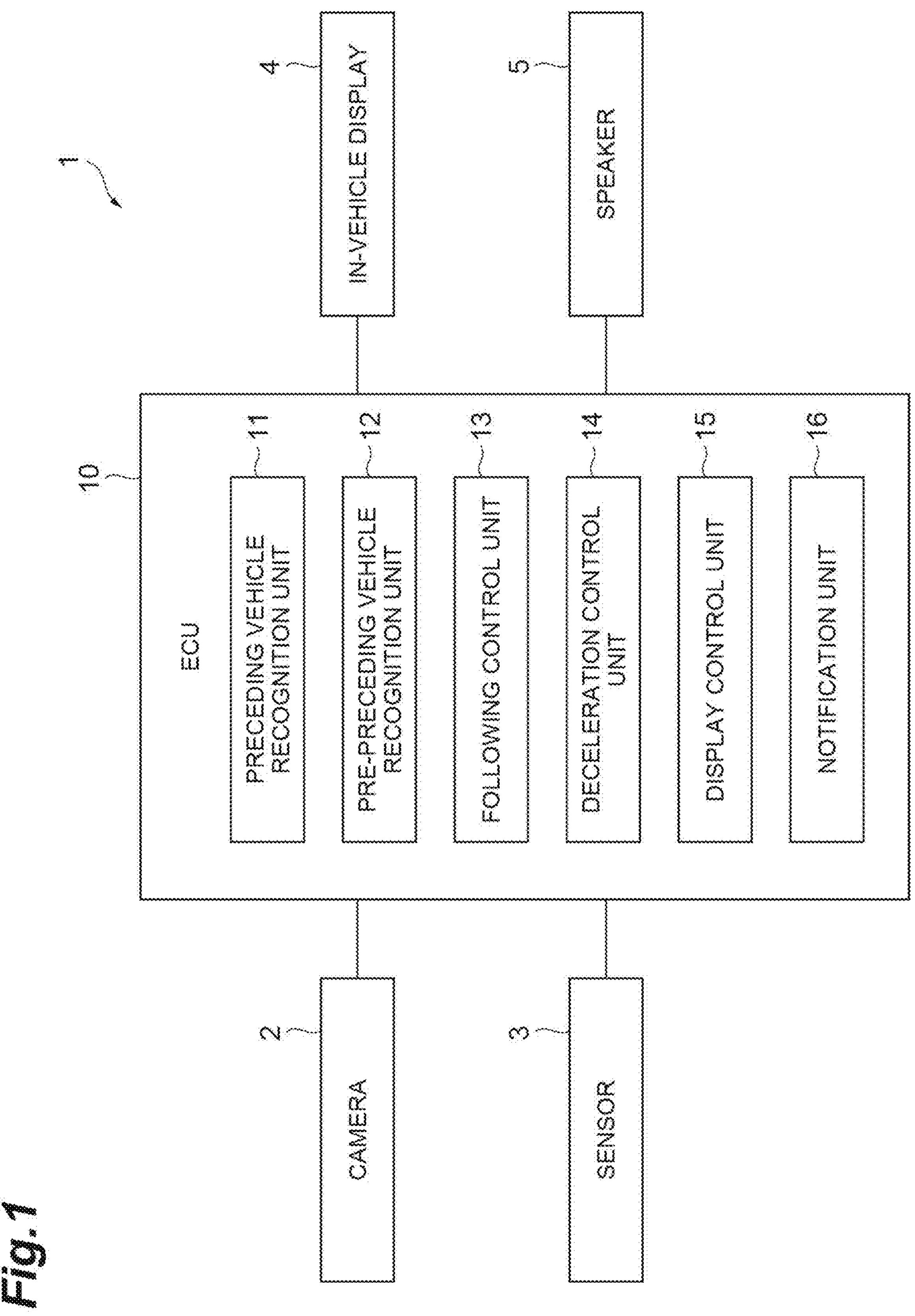
FIG. 1 is a block diagram showing the functional configuration of an in-vehicle display system according to an embodiment.

FIG. 1 is a block diagram showing the functional configuration of an in-vehicle display system according to an embodiment. The in-vehicle display system 1 shown in FIG. 1 is mounted on a host vehicle such as an autonomous driving vehicle or a driving support vehicle. As shown in FIG. 1, the in-vehicle display system 1 includes a camera 2, a sensor 3, an in-vehicle display 4, a speaker 5, and an Electronic Control Unit (ECU) 10. The in-vehicle display system 1 displays the surroundings of the host vehicle on the in-vehicle display 4 inside the vehicle cabin.

The camera 2 captures the external environment of the host vehicle. In this embodiment, the camera 2 is, for example, a front camera provided on the backside of the windshield of the host vehicle and captures the area in front of the host vehicle. The camera captures objects such as the preceding vehicle located in front of the host vehicle. The camera 2 may be a monocular camera or a stereo camera. The camera 2 transmits captured images of the external environment of the host vehicle to the ECU 10.

The sensor 3 is a detection device that detects the external environment of the host vehicle. The external environment refers to the surroundings of the host vehicle. The sensor 3 is, for example, a radar sensor. The radar sensor is a detection device that uses radio waves (for example, millimeter waves) or light to detect objects around the host vehicle. The radar sensor may be, for example, a millimeter-wave radar or a LiDAR (Light Detection and Ranging). The sensor 3 detects the distance and relative position between the host vehicle and the preceding vehicle traveling in front of the host vehicle. Additionally, if possible, the sensor 3 detects the speed of a pre-preceding vehicle. The pre-preceding vehicle is a vehicle ahead of the preceding vehicle. The sensor 3 transmits the detected information of the object to the ECU 10. The sensor 3 is not limited to a radar sensor if it can detect the situation of the preceding vehicle and the pre-preceding vehicle.

The in-vehicle display 4 is provided inside the vehicle cabin of the host vehicle. The in-vehicle display 4 is, for example, provided on the instrument panel of the host vehicle. The in-vehicle display 4 has a display screen 41 (see FIG. 2) for displaying images. The in-vehicle display 4 displays images on the display screen 41 in response to control signals from the ECU 10. The in-vehicle display 4 may also be a Head Up Display (HUD) that performs projection display on the front windshield or a projection screen of the host vehicle.

The speaker 5 is provided inside the vehicle cabin of the host vehicle. The speaker 5 is a device used to provide information to the occupants of the host vehicle through sound. The speaker 5 is configured to output sound or voice to the occupants inside the vehicle cabin of the host vehicle.

The ECU 10 is an electronic control unit having a Central Processing Unit (CPU) and a storage unit such as Read Only Memory (ROM) or Random Access Memory (RAM). In the ECU 10, various functions are realized by executing a program stored in the storage unit on the CPU.

The ECU 10 includes, as a functional configuration, a preceding vehicle recognition unit 11, a pre-preceding vehicle recognition unit 12, a following control unit 13, a deceleration control unit 14, a display control unit 15, and a notification unit 16.

The preceding vehicle recognition unit 11 determines whether a preceding vehicle traveling ahead of the host vehicle exists based on the detection results of at least one of the camera 2 and the sensor 3. The preceding vehicle recognition unit 11 may determine the existence of the preceding vehicle based on the captured image of the camera 2, for example, by using well-known image processing methods such as edge extraction, noise removal, pattern matching, or by using a machine learning model trained by deep learning. The preceding vehicle recognition unit 11 may also determine the existence of the preceding vehicle based on the detection results of radio waves or light reflected by the preceding vehicle. The preceding vehicle recognition unit 11 recognizes the speed of the preceding vehicle and the distance between the host vehicle and the preceding vehicle based on the detection results of the sensor 3.

The pre-preceding vehicle recognition unit 12 determines whether a pre-preceding vehicle traveling in front of the preceding vehicle exists based on the detection results of at least one of the camera 2 and the sensor 3. The pre-preceding vehicle recognition unit 12 may determine the existence of the pre-preceding vehicle based on the captured image of the camera 2, for example, by using well-known image processing methods such as edge extraction, noise removal, pattern matching, or by using a machine learning model trained by deep learning. The pre-preceding vehicle recognition unit 12 may also determine the existence of the pre-preceding vehicle based on the detection results of radio waves or light reflected by the bottom of the preceding vehicle, the road surface on which the preceding vehicle is traveling, or the like. The pre-preceding vehicle recognition unit 12 recognizes the speed of the pre-preceding vehicle and the distance between the host vehicle and the pre-preceding vehicle based on the detection results of the sensor 3.

The following control unit 13 performs following control to adjust the vehicle speed of the host vehicle so that the distance between the host vehicle and the preceding vehicle traveling ahead of the host vehicle becomes a predetermined set distance when the preceding vehicle exists. The following control unit 13 may execute the following control as part of Adaptive Cruise Control (ACC). The following control unit 13 cooperates with a brake hold function that is a function to apply automatic brakes by operating a brake device and causes the host vehicle to run or stop following the preceding vehicle.

The deceleration control unit 14 performs deceleration control to reduce the vehicle speed of the host vehicle when the pre-preceding vehicle exists in front of the preceding vehicle and the vehicle speed of the pre-preceding vehicle is decreasing. The deceleration control unit 14 cooperates with a brake hold function that is a function to apply automatic brakes by operating a brake device and reduces the vehicle speed of the host vehicle.

Figure 2:
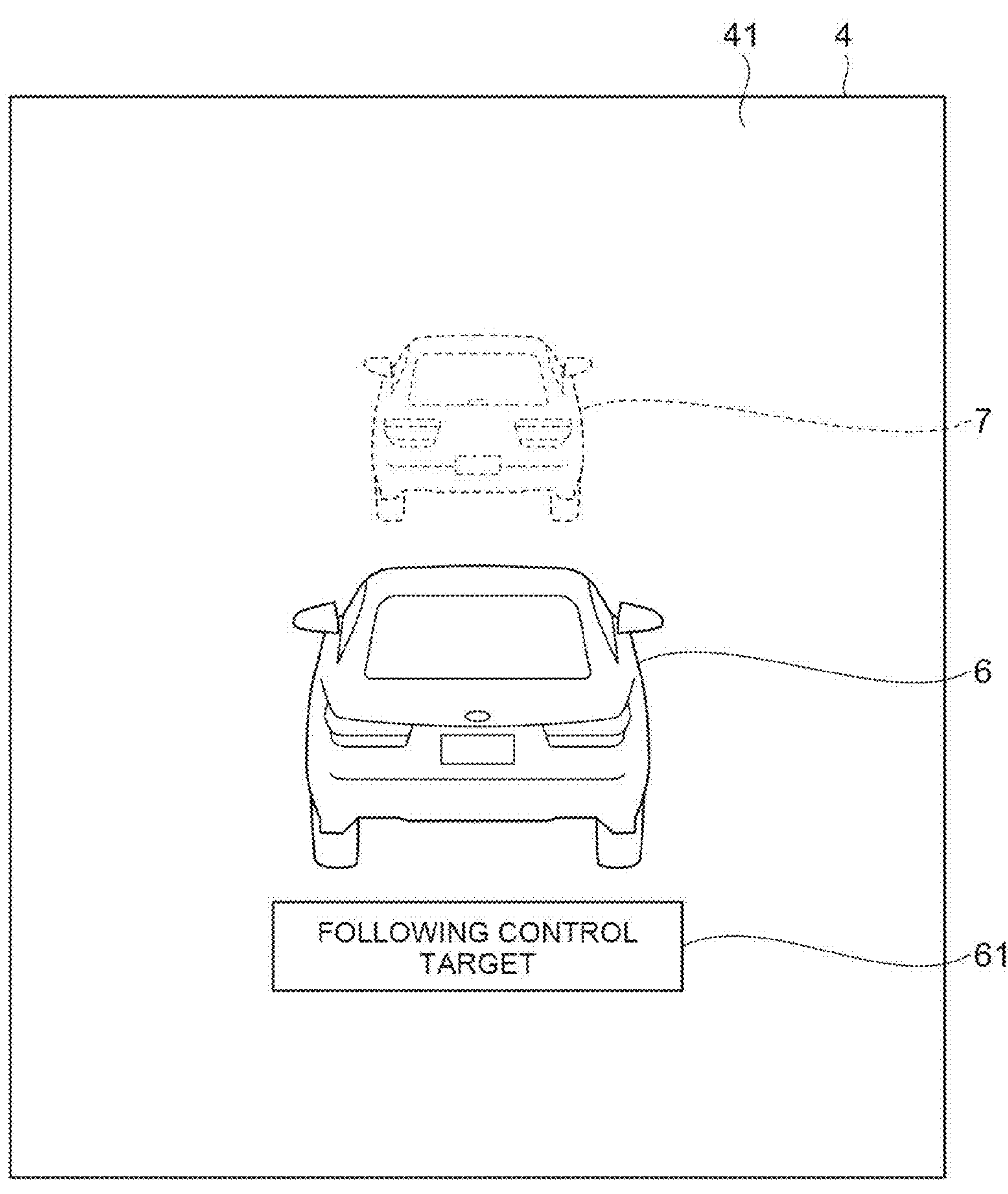
FIG. 2 is a diagram showing an example of a display screen of the in-vehicle display shown in FIG. 1.
Figure 3:
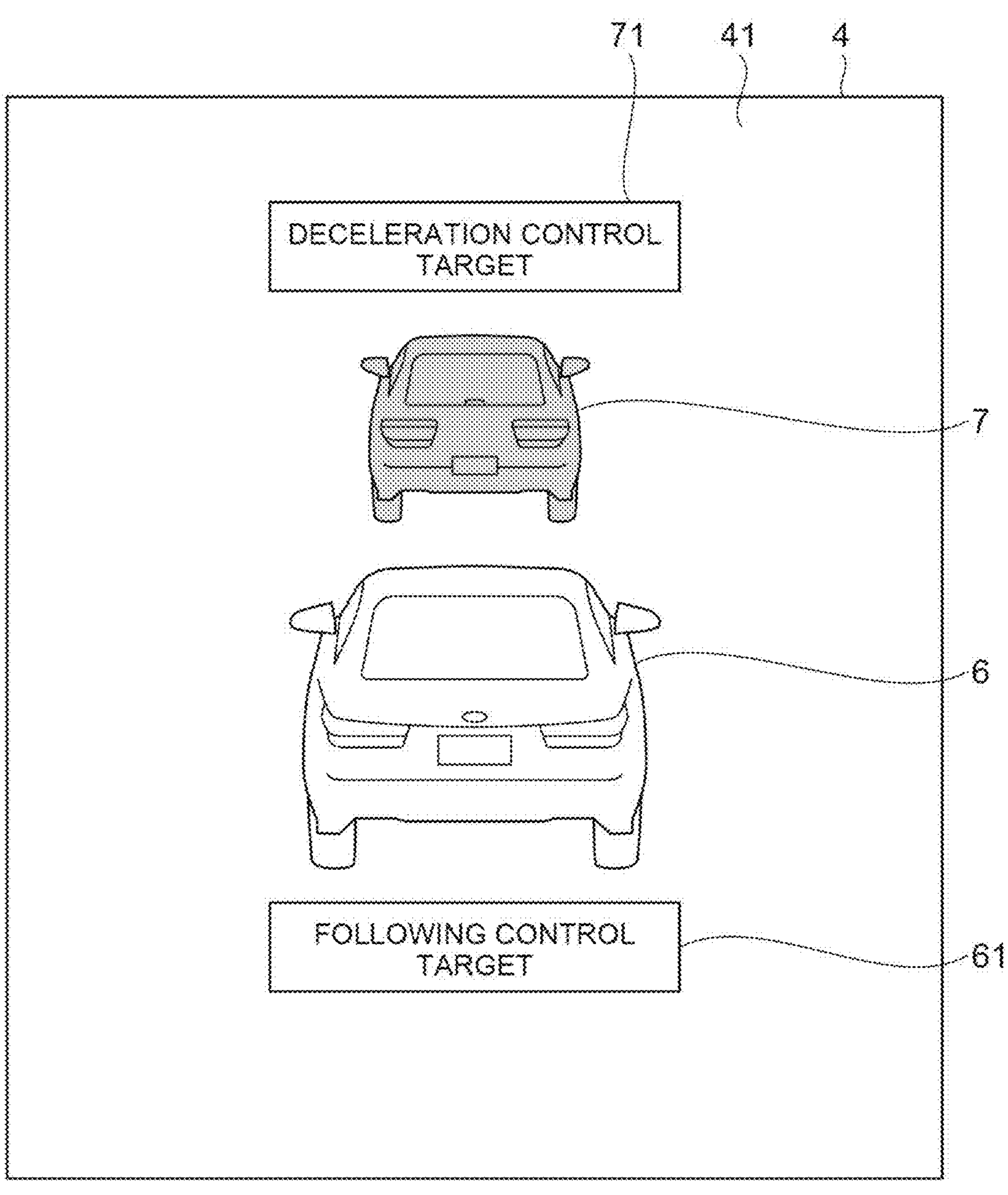
FIG. 3 is a diagram showing an example of a display screen of the in-vehicle display shown in FIG. 1.

The display control unit 15 controls the display of the in-vehicle display 4. FIGS. 2 and 3 each show an example of the display screen 41 of the in-vehicle display 4. As shown in FIG. 2, the display control unit 15 displays a preceding vehicle icon 6 corresponding to the preceding vehicle traveling ahead of the host vehicle on the display screen 41 of the in-vehicle display 4 when the host vehicle performs following control on the preceding vehicle. During the execution of following control, even if a pre-preceding vehicle is detected, the display control unit 15 does not display a pre-preceding vehicle icon 7 corresponding to the pre-preceding vehicle on the display screen 41 of the in-vehicle display 4. In FIG. 2, information displayed on the display screen 41 of the in-vehicle display 4 is represented by solid lines. Information not displayed on the display screen 41 is represented by dashed lines.

When the host vehicle performs following control on the preceding vehicle, the display control unit 15 executes a following control target display on the preceding vehicle icon 6. Specifically, the display control unit 15 controls the color of the preceding vehicle icon 6 and a following control target icon 61 corresponding to the preceding vehicle icon 6 as the following control target display. When the host vehicle performs following control on the preceding vehicle, the display control unit 15 makes the color of the preceding vehicle icon 6, for example, white. When the host vehicle performs following control on the preceding vehicle, the display control unit 15 displays the following control target icon 61 in an area close to the preceding vehicle icon 6 on the display screen 41. The following control target icon 61 includes, for example, the text information "Following Target."

As shown in FIG. 3, when the host vehicle performs deceleration control on the pre-preceding vehicle traveling in front of the preceding vehicle, the display control unit 15 displays a pre-preceding vehicle icon 7 corresponding to the pre-preceding vehicle on the display screen 41 of the in-vehicle display 4. When the host vehicle performs deceleration control on the pre-preceding vehicle, the display control unit 15 executes a deceleration control target display on the pre-preceding vehicle icon 7. Specifically, the display control unit 15 controls the color of the pre-preceding vehicle icon 7 and a deceleration control target icon 71 corresponding to the pre-preceding vehicle icon 7 as the deceleration control target display. The color of the pre-preceding vehicle icon 7 is different from the color of the preceding vehicle icon 6. As an example, when the host vehicle performs deceleration control on the pre-preceding vehicle, the display control unit 15 makes the color of the pre-preceding vehicle icon 7, for example, red or yellow. When the host vehicle performs deceleration control on the pre-preceding vehicle, the display control unit 15 displays the deceleration control target icon 71 in an area close to the pre-preceding vehicle icon 7 on the display screen 41. The deceleration control target icon 71 is different from the following control target icon 61. The deceleration control target icon 71 includes, for example, the text information "Deceleration Target."

During the execution of following control, when the pre-preceding vehicle becomes a deceleration control target of the host vehicle, the display control unit 15 displays the preceding vehicle icon 6 while displaying the pre-preceding vehicle icon 7. During the execution of following control, when the pre-preceding vehicle becomes a deceleration control target of the host vehicle, the display control unit 15 executes a deceleration control target display on the pre-preceding vehicle icon 7 while maintaining the following control target display on the preceding vehicle icon 6. Specifically, during the execution of following control, when the pre-preceding vehicle becomes a deceleration control target of the host vehicle, the display control unit 15 maintains the color of the preceding vehicle icon 6 as white and displays the following control target icon 61 while making the color of the pre-preceding vehicle icon 7 red or yellow. Additionally, the display control unit 15 displays the deceleration control target icon 71.

The notification unit 16 controls the speaker 5. When the pre-preceding vehicle becomes a deceleration control target of the host vehicle, the notification unit 16 outputs a notification sound to the speaker 5. The notification sound may be a periodic sound whose volume or frequency changes over time. The notification sound may be, for example, an intermittent sound. The notification sound may be, for example, a sound that simulates the traveling sound or engine sound of other vehicles. The notification sound may give the listener the impression that other vehicles are approaching.

Figure 4:
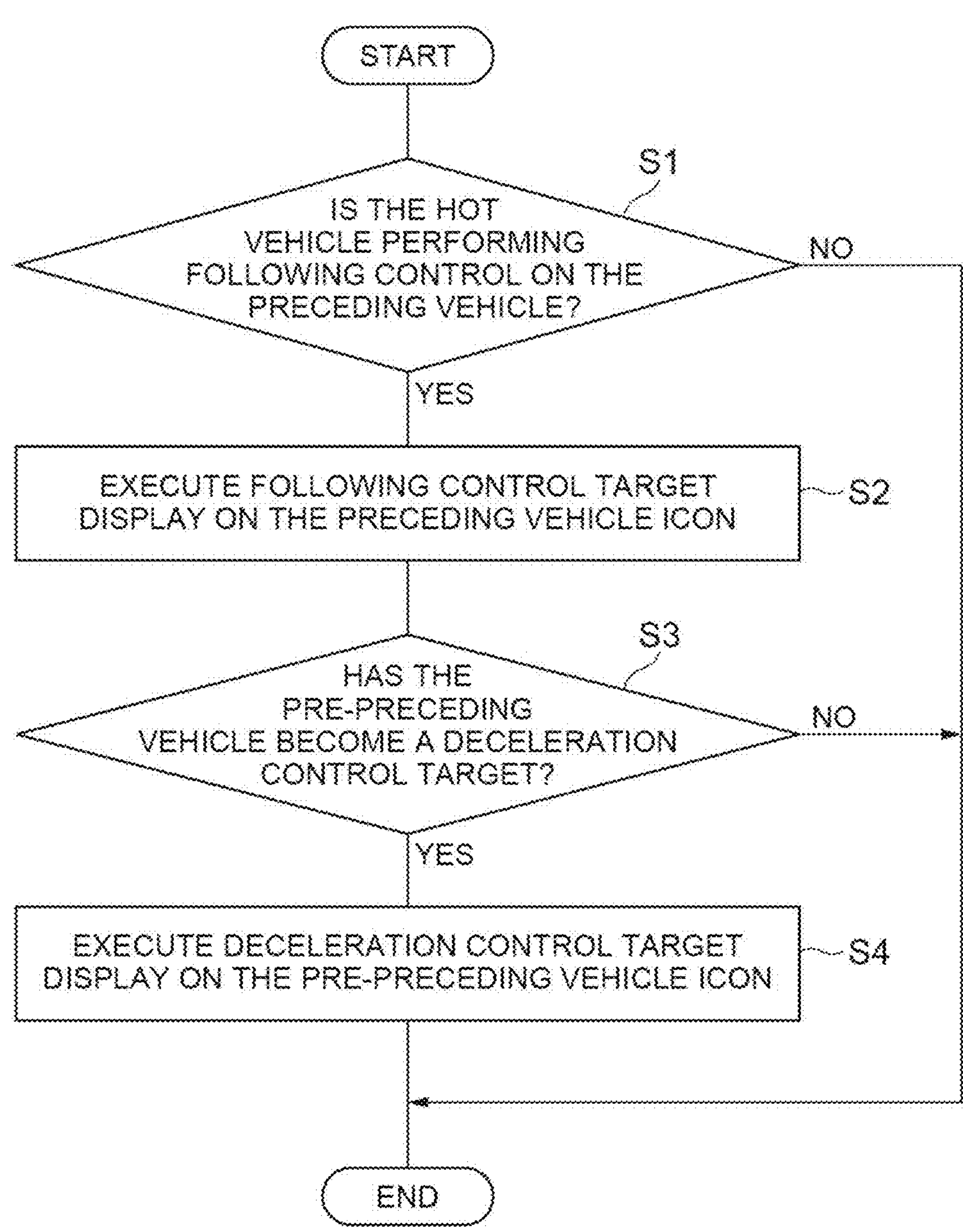
FIG. 4 is a flowchart showing processing by the ECU shown in FIG. 1.

Next, an example of processing by the ECU 10 of the in-vehicle display system 1 will be described. FIG. 4 is a flowchart showing each step of the processing by the ECU 10. As shown in FIG. 4, the ECU 10 determines whether the host vehicle is performing following control on the preceding vehicle in step S1. When the host vehicle is performing following control on the preceding vehicle (step S1: YES), the process proceeds to step S2. When the host vehicle is not performing following control on the preceding vehicle (step S1: NO), the process ends.

In step S2, the ECU 10 executes a following control target display on the preceding vehicle icon 6. In step S3, the ECU 10 determines whether the pre-preceding vehicle has become a deceleration control target. When the pre-preceding vehicle becomes a deceleration control target (step S3: YES), the process proceeds to step S4. When the pre-preceding vehicle is not a deceleration control target (step S3: NO), the process ends. The ECU 10 does not display the pre-preceding vehicle icon 7 when the pre-preceding vehicle is detected but is not a deceleration control target.

In step S4, the ECU 10 executes a deceleration control target display on the pre-preceding vehicle icon 7. In step S4, the ECU 10 displays the preceding vehicle icon 6 while displaying the pre-preceding vehicle icon 7. In step S4, the ECU 10 maintains the color of the preceding vehicle icon 6 as white and maintains the display of the following control target icon 61 while making the color of the pre-preceding vehicle icon 7 red or yellow. Then, the deceleration control target icon 71 is displayed.

As described above, in the in-vehicle display system 1, the display control unit 15 executes a following control target display on the preceding vehicle icon 6 corresponding to the preceding vehicle on the in-vehicle display 4 when the host vehicle performs following control on the preceding vehicle. Additionally, the in-vehicle display system 1 does not display the pre-preceding vehicle icon 7 corresponding to the pre-preceding vehicle on the in-vehicle display 4 during the execution of following control. Furthermore, during the execution of following control, when the pre-preceding vehicle becomes a deceleration control target of the host vehicle, the display control unit 15 executes a deceleration control target display on the pre-preceding vehicle icon 7 on the in-vehicle display 4 while maintaining the following control target display on the preceding vehicle icon 6. As a result, when the pre-preceding vehicle becomes a deceleration control target, the following control target display on the preceding vehicle icon 6 is maintained while the deceleration control target display on the pre-preceding vehicle icon 7 is executed. Therefore, for example, as compared with a case where the deceleration control target display on the pre-preceding vehicle icon 7 is executed instead of the following control target display on the preceding vehicle icon 6, the driver's anxiety can be alleviated. Thus, the in-vehicle display system 1 can alleviate the driver's anxiety.

The notification unit 16 outputs a notification sound to the speaker when the pre-preceding vehicle becomes a deceleration control target of the host vehicle. This allows the driver to be reliably informed that the pre-preceding vehicle has become a deceleration control target.

The display control unit 15 controls the color of the preceding vehicle icon 6 and the following control target icon 61 corresponding to the preceding vehicle icon 6 as the following control target display. This allows the driver to be reliably informed that the preceding vehicle is a following control target.

The display control unit 15 controls the color of the pre-preceding vehicle icon 7 and the deceleration control target icon 71 corresponding to the pre-preceding vehicle icon 7 as the deceleration control target display. This allows the driver to be reliably informed that the pre-preceding vehicle is a deceleration control target. The color of the pre-preceding vehicle icon 7 is different from the color of the preceding vehicle icon 6, and the deceleration control target icon 71 corresponding to the pre-preceding vehicle icon 7 is different from the following control target icon 61 corresponding to the preceding vehicle icon 6. This allows the driver to be informed of the following control target and the deceleration control target, respectively, in a distinguishable manner.

As described above, the embodiment of the present disclosure has been described. However, the present disclosure is not limited to the above-described embodiment.

The in-vehicle display system 1 does not necessarily need to output a notification sound to the speaker 5. The in-vehicle display system 1 may not include the speaker 5 and the notification unit 16.

The display control unit 15 may control either the color of the preceding vehicle icon 6 or the following control target icon 61 as the following control target display. In other words, the display control unit 15 only needs to control at least one of the color of the preceding vehicle icon 6 and the following control target icon 61 as the following control target display.

The display control unit 15 may control either the color of the pre-preceding vehicle icon 7 or the deceleration control target icon 71 as the deceleration control target display. Furthermore, the display control unit 15 may change or add the following control target display when executing the deceleration control target display on the pre-preceding vehicle icon 7. For example, the display control unit 15 may change the following control target display so that the driver understands that the host vehicle is decelerating in response to the deceleration of the pre-preceding vehicle. The display control unit 15 may make the color of the following control target icon 61 or the color of the preceding vehicle icon 6 lighter to make it easier for the driver to notice the deceleration control target display on the pre-preceding vehicle icon 7. The color of the following control target icon 61 or the color of the preceding vehicle icon 6 may be changed to a less stimulating color (for example, from red to blue). The display control unit 15 may add text around the preceding vehicle icon 6 indicating that the host vehicle is decelerating in response to the deceleration of the pre-preceding vehicle. The display control unit 15 may cause the following control target icon 61 or the preceding vehicle icon 6 to blink when the preceding vehicle starts decelerating in response to the deceleration of the pre-preceding vehicle. This allows the driver to be informed of changes in the behavior of the preceding vehicle.

The in-vehicle display system 1 does not necessarily need to include the camera 2. The preceding vehicle recognition unit 11 may recognize the existence of the preceding vehicle based on the detection results of the sensor 3. The pre-preceding vehicle recognition unit 12 may recognize the existence of the pre-preceding vehicle based on the detection results of the sensor 3.

What is claimed is:

1. An in-vehicle display system configured to be mounted on a host vehicle and to display a situation around the host vehicle on an in-vehicle display, comprising:

a display control unit configured to control the display of the in-vehicle display, wherein:

when the host vehicle performs following control on a preceding vehicle traveling ahead of the host vehicle, the display control unit is configured to display a preceding vehicle icon corresponding to the preceding vehicle on the in-vehicle display in a first display mode, during the execution of the following control, the display control unit is configured not to display an icon corresponding to a pre-preceding vehicle traveling ahead of the preceding vehicle on the in-vehicle display, and during the execution of the following control, when the pre-preceding vehicle becomes a deceleration control target of the host vehicle, the display control unit is configured to display a pre-preceding vehicle icon corresponding to the pre-preceding vehicle on the in-vehicle display in a second display mode different from the first display mode, while maintaining display of the preceding vehicle icon in the first display mode.

2. The in-vehicle display system according to claim 1, further comprising:

a notification unit configured to control a speaker in a cabin of the host vehicle, wherein the notification unit is configured to output a notification sound to the speaker when the pre-preceding vehicle becomes the deceleration control target of the host vehicle.

3. The in-vehicle display system according to claim 1, wherein the display control unit is configured to change the color of the preceding vehicle icon as the first display mode, or to display a following control target icon indicating that the preceding vehicle is a following control target near the preceding vehicle icon as the first display mode.

4. The in-vehicle display system according to claim 2, wherein the display control unit is configured to change the color of the preceding vehicle icon as the first display mode, or to display a following control target icon indicating that the preceding vehicle is a following control target near the preceding vehicle icon as the first display mode.

5. The in-vehicle display system according to claim 3, wherein the display control unit controls at least one of the color of the pre-preceding vehicle icon and a deceleration control target icon corresponding to the pre-preceding vehicle icon as the second display mode on the pre-preceding vehicle icon, the color of the pre-preceding vehicle icon of the second display mode is different from the color of the preceding vehicle icon as the first display mode, and wherein the deceleration control target icon is different from the following control target icon.

* * * * *